United States Patent
Hattori et al.

(10) Patent No.: US 6,186,113 B1
(45) Date of Patent: Feb. 13, 2001

(54) DIRECT CYLINDER INJECTION-TYPE SPARK IGNITION INTERNAL COMBUSTION ENGINE

(75) Inventors: Fumiaki Hattori, Mishima; Hiroyuki Hokuto, Susono; Toshimi Kashiwagura, Susono; Mutsumi Kanda, Susono; Makoto Koike; Tetsunori Suzuoki, both of Aichi, all of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/348,284

(22) Filed: Jul. 7, 1999

(30) Foreign Application Priority Data

Jul. 8, 1998 (JP) .................................. 10-193318

(51) Int. Cl.$^7$ ...................................... F02B 3/00
(52) U.S. Cl. ............................ 123/298; 123/305
(58) Field of Search ................... 123/276, 298, 123/305

(56) References Cited

U.S. PATENT DOCUMENTS 5,943,993 * 8/1999 Carstensen et al. ................ 123/298
6,035,823 * 3/2000 Koike et al. ........................ 123/305
6,070,566 * 6/2000 Lee ...................................... 123/298

FOREIGN PATENT DOCUMENTS

| 8-246878 | 9/1996 | (JP) . |
| 9-158736 | 6/1997 | (JP) . |
| 9-317477 | 12/1997 | (JP) . |

* cited by examiner

Primary Examiner—John Kwon
(74) Attorney, Agent, or Firm—Oliff & Berridge, PLC

(57) ABSTRACT

A direct cylinder injection-type spark ignition internal combustion engine is disclosed. The internal combustion engine comprises a spark plug 6, a cavity 8 formed in the top surface of the piston, and a fuel injection valve 7 for injecting fuel into said cavity in nearly the shape of a fan having a relative small thickness. A side wall 8b of the cavity opposed to the fuel injection valve for leading the fuel to the vicinity of the spark plug, has a horizontal arcuate shape which is nearly symmetrical to a first vertical plane (N1). The first vertical plane is separated away from a vertical center plane (Nc) at the center of the fuel and is nearly parallel with the vertical center plane.

2 Claims, 3 Drawing Sheets

DIRECT CYLINDER INJECTION-TYPE SPARK IGNITION INTERNAL COMBUSTION ENGINE

BACKGROUND OF THE INVENTION

1. Field of the Invention

The present invention relates to a direct cylinder injection-type spark-ignition internal combustion engine.

2. Prior Art

There has heretofore been known stratified charge combustion produced by directly injecting fuel into a cylinder to form a mixture only in the vicinity of a spark plug at the ignition timing to burn a lean mixture in the cylinder as a whole. To carry out the stratified charge combustion, in general, the fuel injection valve is opened only for the period required for injecting a required amount of fuel from a crank angle, for starting the fuel injection, set in the latter half of the compression stroke. It is intended that the thus injected fuel proceeds into a concave combustion chamber formed in the top surface of the piston, is deflected toward the spark plug due to the shape of the combustion chamber while being vaporized by robbing heat from the wall surface of the combustion chamber and forms a mixture that can be favorably ignited near the spark plug.

In general, the fuel injection valve injects fuel in a form that is conically concentrated. Therefore, a relative long period is required while the fuel injected in the last stage of fuel injection becomes a combustible mixture utilizing the heat from the wall surface of the combustion chamber. To ensure this period, therefore, the fuel injection end timing must be advanced. An amount of fuel which can be injected in the latter half of the compression stroke, therefore, inevitably decreases, and stratified charge combustion must be abandoned in high engine load operations in which a relatively large amount of fuel is required. It has therefore been desired to carry out stratified charge combustion, which is effective in decreasing the consumption of fuel, over a wider range of engine operations.

Japanese Unexamined Patent Publication (Kokai) No. 9-158736 proposes injecting the fuel in the shape of a flat fan having a relatively small thickness by using a fuel injection valve having an injection hole in the shape of a slit. The thus injected fuel can rob heat from a wide areas of the wall surface of the combustion chamber, making it possible to form a combustible mixture within a short period and to retard the timing for ending the injection of fuel. It is therefore possible to increase an amount of fuel injected in the latter half of the compression stroke and to expand the region of stratified charge combustion toward the high engine load side.

According to the prior art as described above, even if the timing for ending the injection of fuel is retarded, a combustible mixture can be reliably formed from the injected fuel at an ignition timing. The thus formed combustible mixture has a flat shape with its length being shorter than the width thereof and rises nearly in the direction of the length. The ignition timing must occur while the combustible mixture is rising and is coming into contact with the spark plug. However, the combustible mixture has a relative short length and stays contacted to the spark plug while it is rising for only a relative short period. Therefore, it may often happen that the combustible mixture has already passed over the spark plug at the ignition timing due to a slight deviation in the timing for forming the combustible mixture, and reliable ignition performance is not maintained.

SUMMARY OF THE INVENTION

The object of the present invention therefore is to reliably maintain the ignition performance and to reliably expand the region of the stratified charge combustion toward the high engine load side in a direct cylinder injection-type spark ignition internal combustion engine in which the fuel is injected in the form of a flat fan having a relative small thickness.

According to the present invention, there is provided a direct cylinder injection-type spark ignition internal combustion engine comprising a spark plug, a cavity formed in the top surface of the piston, and a fuel injection valve for injecting fuel into the cavity in nearly the shape of a fan having a relative small thickness, wherein a side wall of the cavity opposed to the fuel injection valve, for leading the fuel to the vicinity of the spark plug, has a horizontal arcuate shape which is nearly symmetrical to a first vertical plane, the first vertical plane being separated away from a vertical center plane at the center of said fuel and being nearly in parallel with the vertical center plane.

DESCRIPTION OF THE PREFERRED EMBODIMENT

Figure 1:
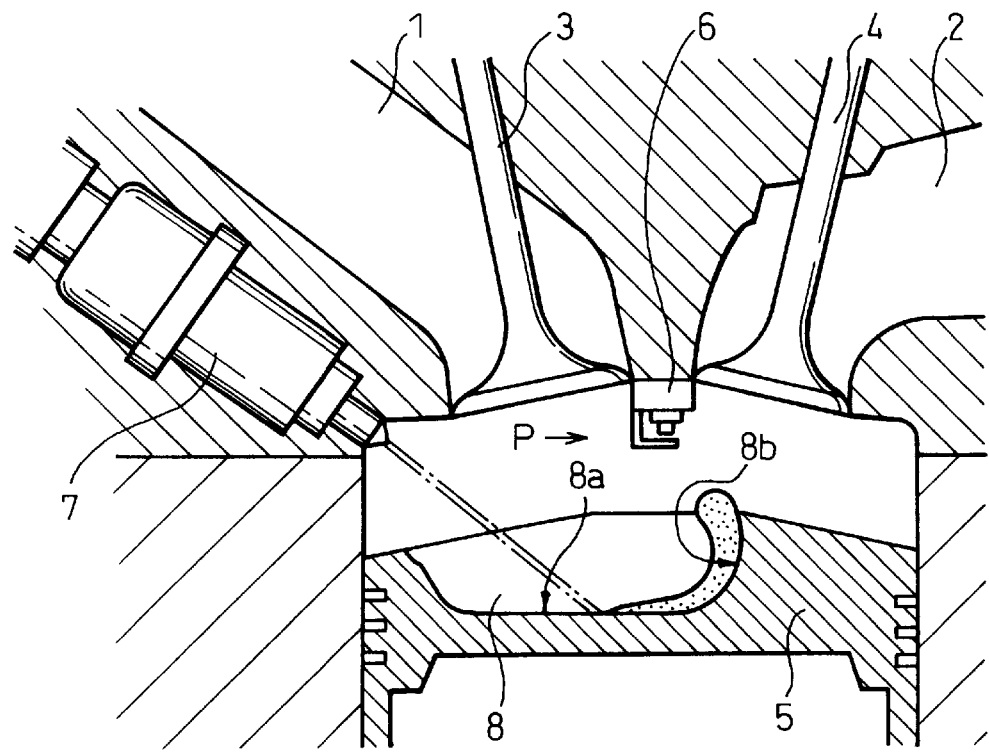
FIG. 1 is a vertical sectional view schematically illustrating a direct cylinder injection-type spark ignition internal combustion engine according to an embodiment of the present invention.
Figure 2:
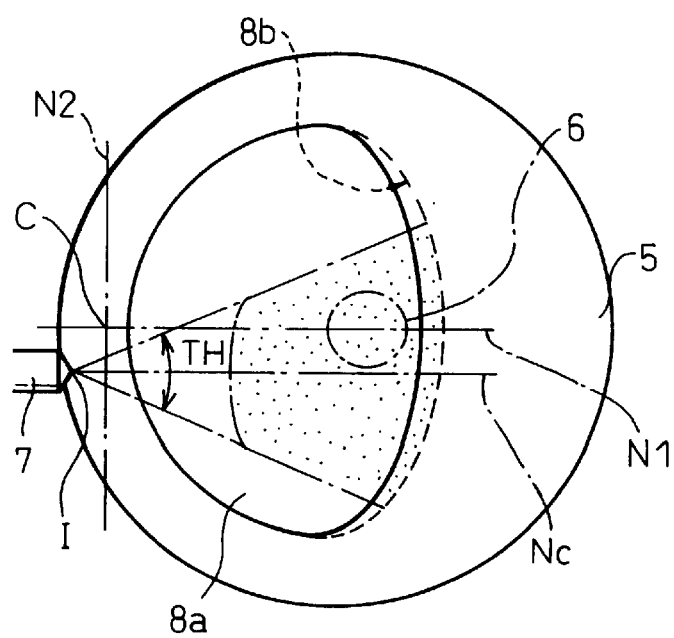
FIG. 2 is a plan view of a piston shown in FIG. 1.

FIG. 1 is a vertical sectional view schematically illustrating a direct cylinder injection-type spark ignition internal combustion engine according to a first embodiment of the present invention, and FIG. 2 is a plan view of a piston shown in FIG. 1. In these drawings, reference numeral 1 denotes an intake port and 2 denotes an exhaust port. The intake port 1 is communicated with the interior of the cylinder through an intake valve 3, and the exhaust port 2 is communicated with the interior of the cylinder through an exhaust valve 4. Reference numeral 5 denotes a piston, and 6 denotes a spark plug arranged at an upper portion nearly at the center of the cylinder. A fuel injection valve 7 injects fuel in the shape of a fan having a relative small thickness and a predetermined contained angle (TH).

In a homogeneous combustion region where a high engine output is required, the fuel injection valve 7 injects fuel in a required amount in the intake stroke thereby to form a homogeneous mixture in the cylinder at the ignition timing. In a stratified charge combustion region, on the other hand, the fuel injection valve 7 starts injecting the fuel from a crank angle set for every engine operation to inject fuel in a required amount in the latter half of the compression stroke. As shown in FIG. 1, the fuel injected in the latter half of the compression stroke proceeds into a concave cavity 8 formed in the top surface of the piston 5, collides with a bottom wall 8a of the cavity 8 and proceeds toward a side wall 8b along the bottom wall 8a. The side wall 8b of the cavity 8 has a vertical arcuate shape smoothly continuing to the bottom wall 8a, whereby the fuel that has arrived at the side wall 8b is deflected toward this side and up along the side wall 8b, and is directed toward the spark plug 6. In the following description, the word "this side" means the side of the fuel injection valve.

The fuel injected by the fuel injection valve 7 is of a flat fan shape having a relative small thickness. Therefore, the fuel after having collided with the bottom wall 8a of the cavity 8 travels on the bottom wall 8a and the side wall 8b of the cavity 8 while spreading in the direction of width as represented by dots in FIG. 2, and favorably absorbs heat from the cavity 8 to form, within a short period, a mixture (hereinafter referred to as combustible mixture) that can be favorably ignited. To realize the stratified charge combustion, at least the fuel injected at the last stage of fuel injection must be forming a combustible mixture at the ignition timing. Upon injecting the fuel in the flat fan shape having a relative small thickness, it is allowed to shorten the period from the end of the fuel injection to the ignition timing, i.e., it is allowed to retard the end of fuel injection, so that a relative large amount of fuel can be used for forming a combustible mixture at the ignition timing.

Figure 4A:
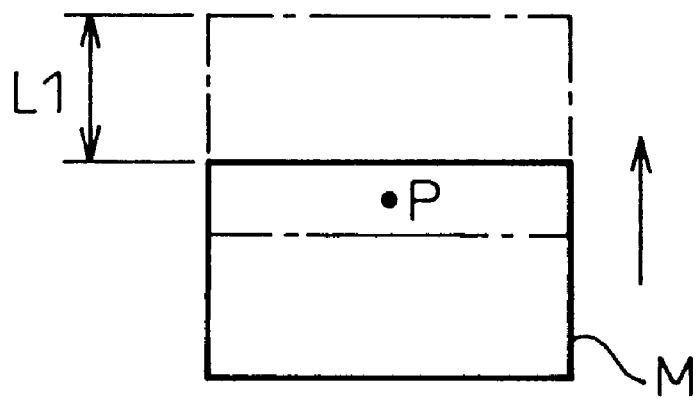
FIG. 4(A) is a diagram illustrating a behavior of the combustible mixture according to a prior art.

As represented by a solid line (M) in FIGS. 4(A) and (B), the thus formed combustible mixture has a flat shape with its length being shorter than the width thereof. Though not diagrammed, the thickness is relatively small. According to the prior art as shown in FIG. 4(A), the combustible mixture (M) rises nearly in the direction of length. Therefore, the combustible mixture (M) stays contacted to the igniting position (P) of the spark plug for only a relative short period of moving over a distance (L1), and the ignition timing must come within this relative short period. Therefore, when the timing for forming the combustible mixture is deviated even slightly due to a slight deviation in the fuel injection timing, the combustible mixture may have often passed over the spark plug already at the ignition timing making it difficult to reliably ensure the ignition performance.

The present invention solves this problem. According to the embodiment, the side wall 8b of the cavity 8 formed in the top surface of the piston 5 has a horizontal arcuate shape nearly symmetrical with respect to a first vertical plane (N1). In this embodiment, the first vertical plane (N1) is in agreement with a vertical plane that passes through the center of the piston 5, though this is not intended to limit the present invention. Furthermore, the fuel injection valve 7 is so disposed that a vertical plane (Nc) at the center of the fan-shaped fuel that is injected is separated away from the first vertical plane (N1) and is nearly parallel with the first vertical plane (N1). That is, the vertical plane (Nc) at the center of the fuel is offset from the first vertical plane (N1) at the center of the side wall 8b of the cavity 8.

Moreover the fuel injection valve 7 is disposed at a peripheral portion of the cylinder on the side of the intake port 1, and the position (I) of the injection hole of the fuel injection valve 7 is on the side opposite to the side wall 8b beyond a second vertical plane (N2) which is intersected at right angles by the first vertical plane (N1) and which passes through the center (C) of arc of the side wall 8b of the cavity 8.

Figure 3:
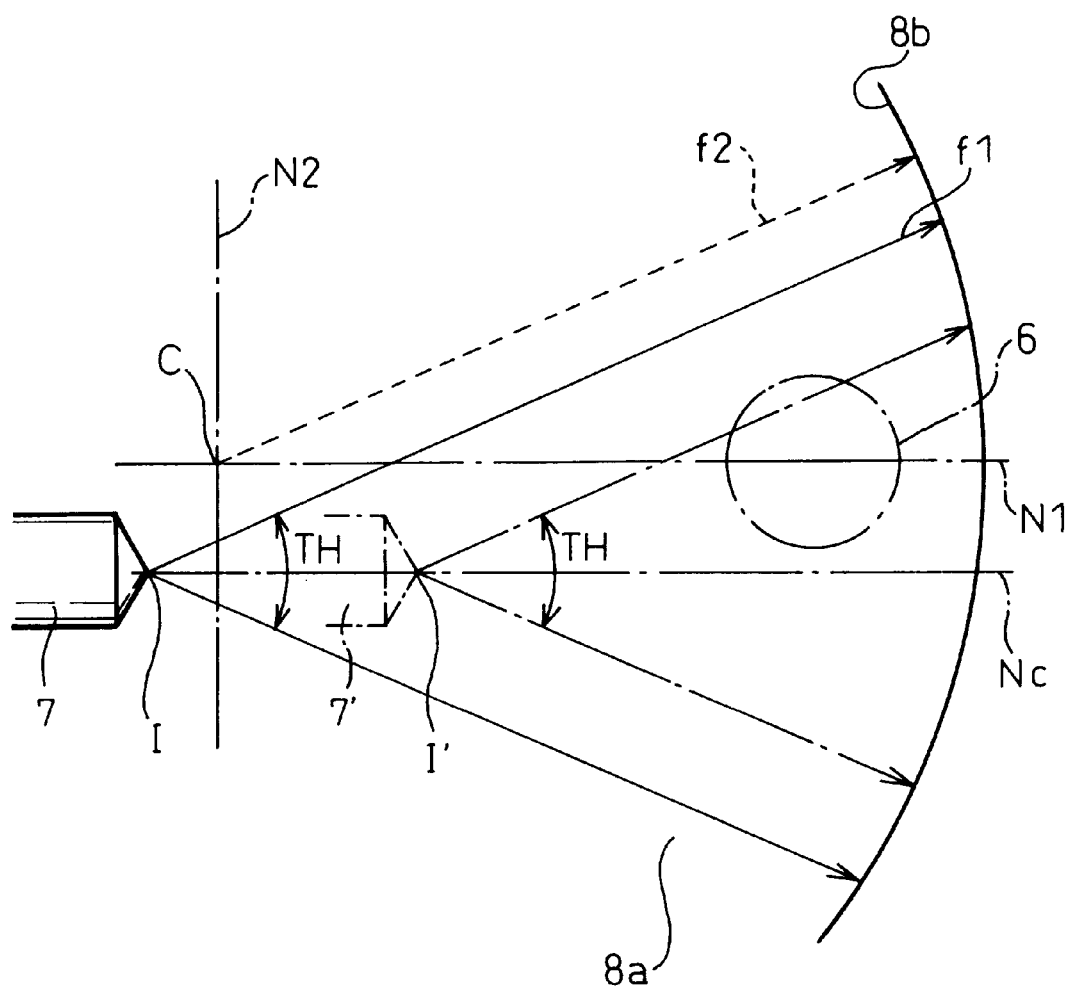
FIG. 3 is an enlarged plan view schematically illustrating a positional relationship between a fuel injection valve and a cavity.

FIG. 3 is an enlarged plan view schematically illustrating the above-mentioned positional relationship between the fuel injection valve 7 and the side wall 8b of the cavity 8. The fuel injected from the fuel injection valve 7 arrives at the side wall 8b of the cavity 8 with a predetermined contained angle (TH) and is deflected toward this side and upside. Moreover, since each travel direction of the fuel defines an acute angle from the right side (hereinafter, the right-and-left direction is the one as viewed from side of the fuel injection valve) with respect to the side wall 8b in the horizontal direction, all of the fuel injected is deflected toward the left, i.e., toward the first vertical plane (N1). This is because the vertical plane (Nc) at the center of the fuel injected from the fuel injection valve 7 is offset, i.e., located on the right side of the first vertical plane (N1), as will be obvious from a comparison of each travel direction of the fuel with a direction which is parallel with each travel direction of the fuel and which passes through the center (C) of arc of the side wall 8b, i.e., from a comparison of each travel direction of the fuel with a direction in parallel with each travel direction of the fuel and which is at right angles with the side wall 8b (e.g., comparison of f1 with f2).

Figure 4B:
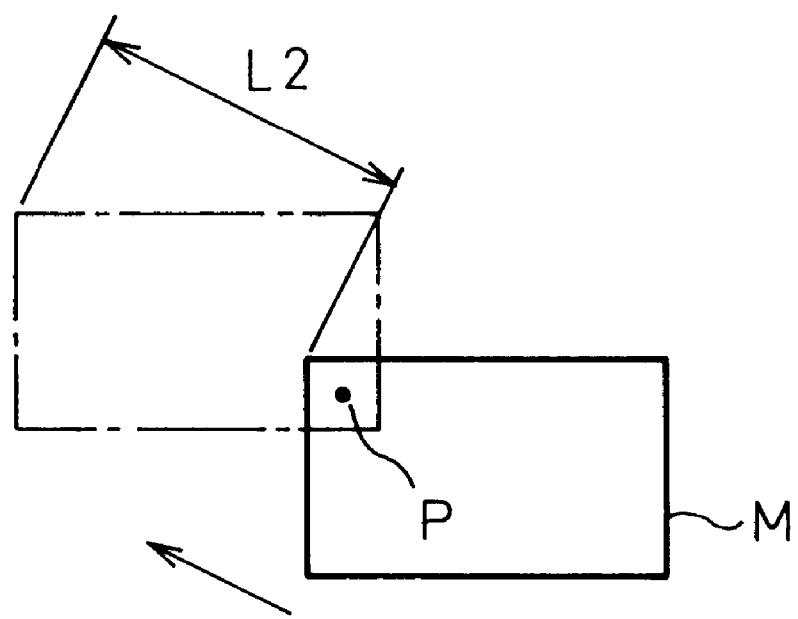
FIG. 4(B) is a diagram illustrating a behavior of the combustible mixture according to the embodiment of the present invention.

Thus, the fuel injected in nearly a fan shape is deflected toward this side and up by the side wall 8b of the cavity 8, and is further deflected toward the left. Then, the combustible mixture formed by the fuel moves aslant and upward toward the spark plug 6 from the right lower side as viewed on a plane. That is, as shown in FIG. 4(B), the combustible mixture (M) rises nearly toward the left upper side in an inclined manner. The combustible mixture (M) comes into contact with the igniting position (P) while it moves over the distance (L2). The moving speed of the combustible mixture (M) is determined by the kinetic energy possessed by the injected fuel, and is considered to be nearly the same between the conventional case shown in FIG. 4(A) and the case of this embodiment shown in FIG. 4(B).

The distance (L2) is very much longer than the above-mentioned distance (L1). That is, in this embodiment, the combustible mixture stays contacted with the igniting position (P) for a relative long period. Therefore, despite of a slight deviation in the timing for forming the combustible mixture due to a slight deviation in the fuel injection timing, it is not likely that the combustible mixture will have already passed over the spark plug at the ignition timing, and the ignition performance is reliably ensured.

In this embodiment, as above-mentioned, the position (I) of the injection hole of the fuel injection valve 7 is located beyond the second vertical plane (N2) on the side opposite to the side wall 8b. Therefore, each travel direction of the fuel on the left side forms a large acute angle with respect to the side wall 8b compared to when the position (I') of injection hole of the fuel injection valve 7' is located on the side of the side wall within the second vertical plane (N2) as indicated by a dot-dash chain line in FIG. 3.

While the combustible mixture moves, therefore, the left side of the combustible mixture slowly moves toward the left side and hardly comes in contact with the cylinder bore. This prevents a problem in that the engine oil is diluted due to the fuel adhered on the cylinder bore.

Although the invention has been described with reference to specific embodiments thereof, it should be apparent that numerous modifications can be made thereto, by those skilled in the art, without departing from the basic concept and scope of the invention.

What is claimed is:

1. A direct cylinder injection-type spark ignition internal combustion engine comprising a spark plug, a cavity formed in the top surface of the piston, and a fuel injection valve for injecting fuel into said cavity in nearly the shape of a fan having a relative small thickness, wherein a side wall of said cavity opposed to said fuel injection valve, for leading said fuel to the vicinity of said spark plug, has a horizontal arcuate shape which is nearly symmetrical to a first vertical plane, said first vertical plane being separated away from a vertical center plane at the center of said fuel and being nearly in parallel with said vertical center plane.

2. A direct cylinder injection-type spark ignition internal combustion engine according to claim 1, wherein the position of the injection hole of said fuel injection valve is located on the side opposite to the side wall of said cavity beyond a second vertical plane, said second vertical plane being at right angles with said first vertical plane, and passing through the center of the arc of the side wall of said cavity.

* * * * *